United States Patent
Shimizu et al.

(10) Patent No.: US 8,292,771 B2
(45) Date of Patent: Oct. 23, 2012

(54) HYDRAULIC CONTROL APPARATUS OF AUTOMATIC TRANSMISSION

(75) Inventors: Tetsuya Shimizu, Anjo (JP); Yoshimitsu Hyodo, Nishio (JP); Satoshi Nishio, Aichi-ken (JP); Kazuki Kojima, Kariya (JP); Kazunori Ishikawa, Toyota (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 133 days.

(21) Appl. No.: 13/023,824

(22) Filed: Feb. 9, 2011

(65) Prior Publication Data

US 2011/0219904 A1 Sep. 15, 2011

(30) Foreign Application Priority Data

Mar. 11, 2010 (JP) .................................. 2010-055012

(51) Int. Cl.
*F16H 31/00* (2006.01)
(52) U.S. Cl. ........................ 475/116; 475/127; 475/134
(58) Field of Classification Search .................. 475/114, 475/116, 127, 131, 134; 477/127, 130, 131, 477/143, 149, 156, 158, 163, 164
See application file for complete search history.

(56) References Cited

U.S. PATENT DOCUMENTS

| | | | |
|---|---|---|---|
| 5,895,334 A | 4/1999 | Yu | |
| 6,729,988 B2 * | 5/2004 | Katou et al. | 475/128 |
| 2006/0084545 A1 | 4/2006 | Morise et al. | |
| 2007/0167283 A1 * | 7/2007 | Sato et al. | 477/156 |

FOREIGN PATENT DOCUMENTS

| | | |
|---|---|---|
| JP | 64-007939 U | 1/1989 |
| JP | 5-060207 A | 3/1993 |
| JP | 10-089452 A | 4/1998 |
| JP | 11-037269 A | 2/1999 |
| JP | 2006-112503 A | 4/2006 |

OTHER PUBLICATIONS

International Search Report (ISR) for corresponding International Patent Application No. PCT/JP2011/051793 mailed Apr. 5, 2011.

* cited by examiner

*Primary Examiner* — Justin Holmes
(74) *Attorney, Agent, or Firm* — Sughrue Mion, PLLC (57) ABSTRACT

A hydraulic control apparatus of an automatic transmission including a switching portion which, at the same time as a reverse range pressure oil passage and a discharge delay oil passage which delays an oil pressure output are connected, causes the reverse range pressure oil passage and discharge delay oil passage, by switching between the two, in order to communicate with a hydraulic servo. The switching portion causes the hydraulic servo and discharge delay oil passage to communicate when a manual valve is switched to an N range, and causes the hydraulic servo and reverse range pressure oil passage to communicate when the manual valve (MV) is switched to a D range or an R range. Because of this arrangement, it is difficult for oil, when discharged from the hydraulic servo, to drain at an R-N switching time, and it is easy for oil to drain in the D range or the like.

2 Claims, 7 Drawing Sheets

|   | C-1 | C-2 | C-3 | B-1 | B-2 | F-1 |
|---|---|---|---|---|---|---|
| P |   |   |   |   | △ |   |
| REV |   |   | ○ |   | ○ |   |
| N |   |   |   |   | △ |   |
| 1ST | ○ |   |   |   | ⊚ | ○ |
| 2ND | ○ |   |   | ○ |   |   |
| 3RD | ○ |   | ○ |   |   |   |
| 4TH | ○ | ○ |   |   |   |   |
| 5TH |   | ○ | ○ |   |   |   |
| 6TH |   | ○ |   | ○ |   |   |

※ (○) ENGINE BRAKING TIME

△ LOW PRESSURE STAND-BY

HYDRAULIC CONTROL APPARATUS OF AUTOMATIC TRANSMISSION

INCORPORATION BY REFERENCE

The disclosure of Japanese Patent Application No. 2010-055012 filed on Mar. 11, 2010, including the specification, drawings and abstract thereof, is incorporated herein by reference in its entirety.

BACKGROUND OF THE INVENTION

1. Field of the Invention

The present invention relates to a hydraulic control apparatus of an automatic transmission mounted in a vehicle or the like, and particularly, relates to a hydraulic control apparatus of an automatic transmission with which oil passages for discharging an oil pressure from a hydraulic servo of a frictional engagement element are made switchable.

2. Description of the Related Art

In general, with a multi-stage automatic transmission mounted in a vehicle or the like, each speed stage is formed by controlling a rotation condition of each rotational element of a speed change gear mechanism using an engagement condition of a plurality of frictional engagement elements, and the engagement condition of the plurality of frictional engagement elements is controlled by an engagement pressure being electrically adjusted using a solenoid valve and supplied to a hydraulic servo of each frictional engagement element.

Meanwhile, with an automatic transmission disclosed in JP-A-2006-112503, as shown in FIGS. 3 and 4 of the same document, a pressure output from a manual valve (4100) is supplied to a hydraulic servo of a B2 brake, at a reverse range formation time (R), via an R range pressure oil passage (4104), a B2 control valve (4600), and a B2 oil passage (3622), whereby the B2 brake is engaged. Then, when the manual valve (4100) switches from an R range to an N range or a D range, the oil pressure of the hydraulic servo of the B2 brake is swiftly discharged from a drain port (EX) of the manual valve (4100) via the B2 oil passage 3622, B2 control valve (4600), and R range pressure oil passage (4104), in the order opposite to that at a supply time.

SUMMARY OF THE INVENTION

However, for example, in a kind of case in which the range of the manual valve is switched from R to N to R when a vehicle or the like is put into a garage, in the event that oil is swiftly discharged from the hydraulic servo of the B2 brake when the range switches from R to N, as in JP-A-2006-112503, there is a danger that it takes time or a gear change shock occurs when the range switches next from N to R, and an oil pressure is supplied again to the hydraulic servo of the B2 brake. For this reason, there is a need to make it difficult for oil to drain from the hydraulic servo of the B2 brake at the R-N switching time.

Meanwhile, in a case in which it is always difficult for oil to drain from the hydraulic servo of the B2 brake, when the manual valve is in the D range, there is a danger that oil leaking into a discharge oil passage of the B2 brake is supplied to the hydraulic servo of the B2 brake. Consequently, from this kind of view point, there is a need to make it easy for oil to drain from the hydraulic servo of the B2 brake, opposite to the heretofore described need.

Therefore, the invention has an object of providing a hydraulic control apparatus of an automatic transmission with which it is made difficult for an oil pressure, when discharged from a second hydraulic servo of a second frictional engagement element, to drain at an R-N switching time, while it is made easy for it to drain in a D range or the like.

According to the invention of first aspect, as a third switching portion can cause a second hydraulic servo and discharge delay oil passage to communicate when a manual valve is switched to a neutral range, and cause the second hydraulic servo and reverse range pressure passage to communicate when the manual valve is switched to a forward range or reverse range, it is possible, when the manual valve is switched to the neutral, to slowly drain the oil pressure of the second hydraulic servo via the discharge delay oil passage, and cause the second hydraulic servo to maintain the oil pressure, while it is possible, in the forward range or the like in which there is a danger that an oil leakage or the like occurs when the oil pressure is thus maintained, to swiftly drain the oil pressure via the reverse range pressure oil passage. That is, it is possible to use both the discharge delay oil passage and reverse range pressure oil passage in accordance with a switching condition of the manual valve. Furthermore, because of this, for example, a freedom in diameter of an orifice used in a delay portion increases, meaning that it is possible to reduce an engagement shock of a frictional engagement element when the range is switched from the reverse range to the neutral range to the reverse range (R-N-R), and to smoothly carry out a transition of a second friction engagement element to an engagement when the range is switched to the neutral.

According to the invention of second aspect, as it is possible to reduce the number of switching valves, it is possible to reduce the number of parts, and simplify the whole configuration.

DETAILED DESCRIPTION OF THE EMBODIMENTS

First Embodiment

Hereafter, a description will be given, following FIGS. 1 to 6, of a first embodiment according to the invention.

Outline Configuration of Automatic Transmission

Figure 1:
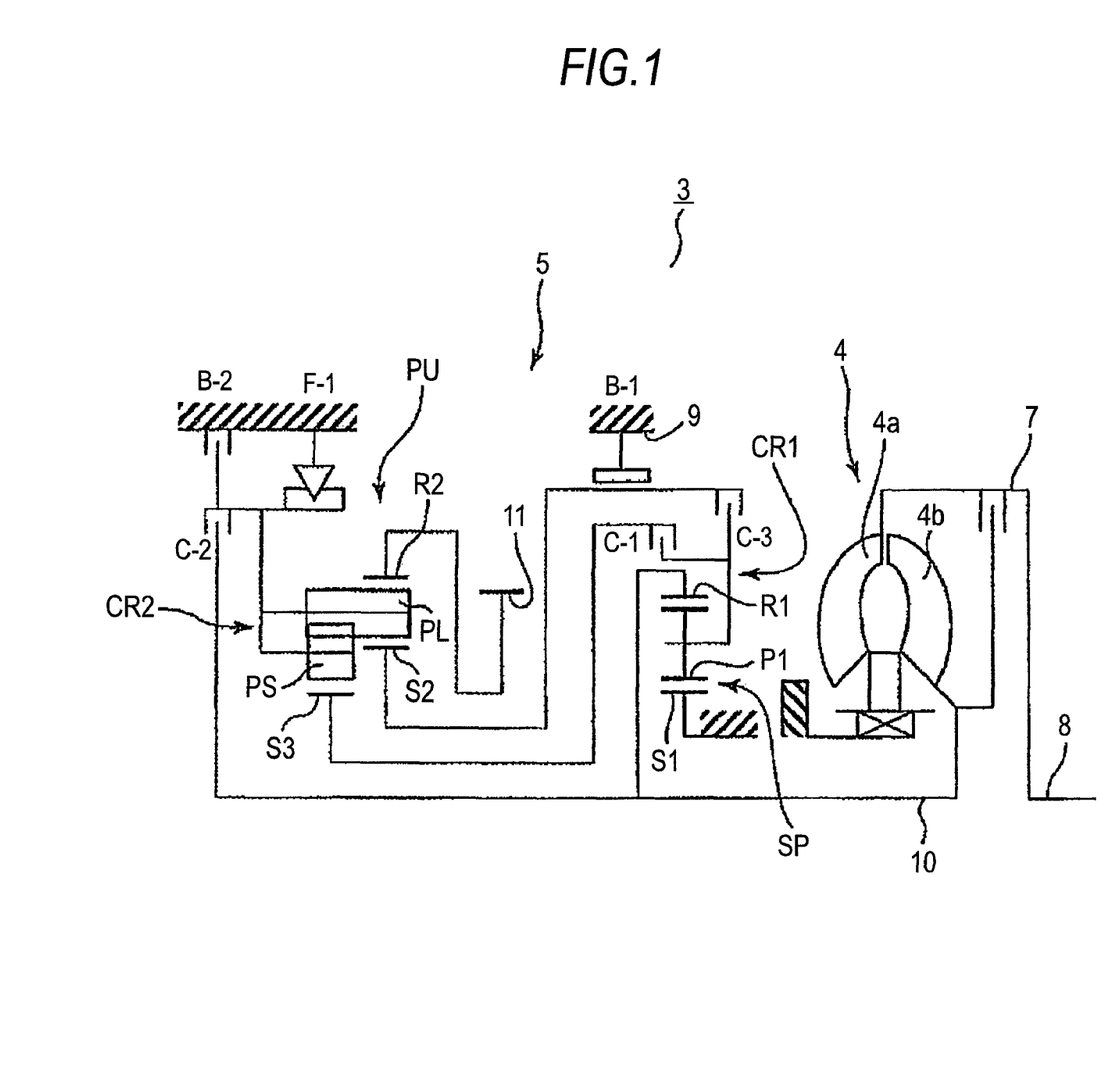
FIG. 1 is a skeleton diagram of an automatic transmission according to the invention.

Firstly, a description will be given, following FIG. 1, of an outline configuration of an automatic transmission 3 to which the invention can be applied. As shown in FIG. 1, the automatic transmission 3 suitable for use in, for example, an FF type (front engine, front drive) vehicle, having an input shaft 8 of the automatic transmission 3 which can be connected to an engine (not shown), includes a torque converter 4 and an automatic transmission mechanism 5 centered on an axial direction of the input shaft 8.

The torque converter 4 has a pump impeller 4a connected to the input shaft 8 of the automatic transmission 3 and a turbine runner 4b to which a rotation of the pump impeller 4a is transmitted via a hydraulic fluid, and the turbine runner 4b is connected to an input shaft 10 of the automatic transmission mechanism 5 disposed coaxially with the input shaft 8. Also, a lock-up clutch 7 is included in the torque converter 4, and on the lock-up clutch 7 being engaged, a rotation of the input shaft 8 of the automatic transmission 3 is directly transmitted to the input shaft 10 of the automatic transmission mechanism 5.

The automatic transmission mechanism 5 is provided with a planetary gear SP and a planetary gear unit PU on the input shaft 10. The planetary gear SP, including a sun gear S1, a carrier CR1, and a ring gear R1, is a so-called single pinion planetary gear having in the carrier CR1 a pinion P1 which meshes with the sun gear S1 and ring gear R1.

Also, the planetary gear unit PU, having a sun gear S2, a sun gear S3, a carrier CR2, and a ring gear R2 as four rotational elements, is a so-called Ravigneaux type planetary gear having in the carrier CR2 a long pinion PL which meshes with the sun gear S2 and ring gear R2, and a short pinion PS which meshes with the sun gear S3, in a form in which the pinions PL and PS mesh with each other.

The sun gear S1 of the planetary gear SP, being connected to an unshown boss integrally fixed to a transmission case 9, is fixed in rotation. Also, a rotation of the ring gear R1 is the same as the rotation of the input shaft 10 (hereafter referred to as an "input rotation"). Furthermore, the carrier CR1, as well as attaining a decelerated rotation wherein the input rotation is decelerated by the fixed sun gear S1 and the input rotating ring gear R1, is connected to a clutch C-1 (a first frictional engagement element) and a clutch C-3 (a third frictional engagement element).

The sun gear S2 of the planetary gear unit PU, as well as being connected to a brake B-1 configured of a hand brake and arranged so as to be fixable to the transmission case 9, is connected to the clutch C-3 and arranged so that the decelerated rotation of the carrier CR1 can be input via the clutch C-3. Also, the sun gear S3, being connected to the clutch C-1, is arranged so that the decelerated rotation of the carrier CR1 can be input.

Furthermore, the carrier CR2, being connected to a clutch C-2 (a second frictional engagement element) into which the rotation of the input shaft 10 is input, is arranged so that the input rotation can be input via the clutch C-2. Also, the carrier CR2, being connected to a one-way clutch F-1 and a brake B-2, is arranged so that, as well as a rotation being limited in one direction with respect to the transmission case 9 via the one-way clutch F-1, a rotation is fixable via the brake B-2. Then, the ring gear R2 is connected to a counter gear 11, and the counter gear 11 is connected to a drive wheel via an unshown counter shaft and differential device.

Figure 2:
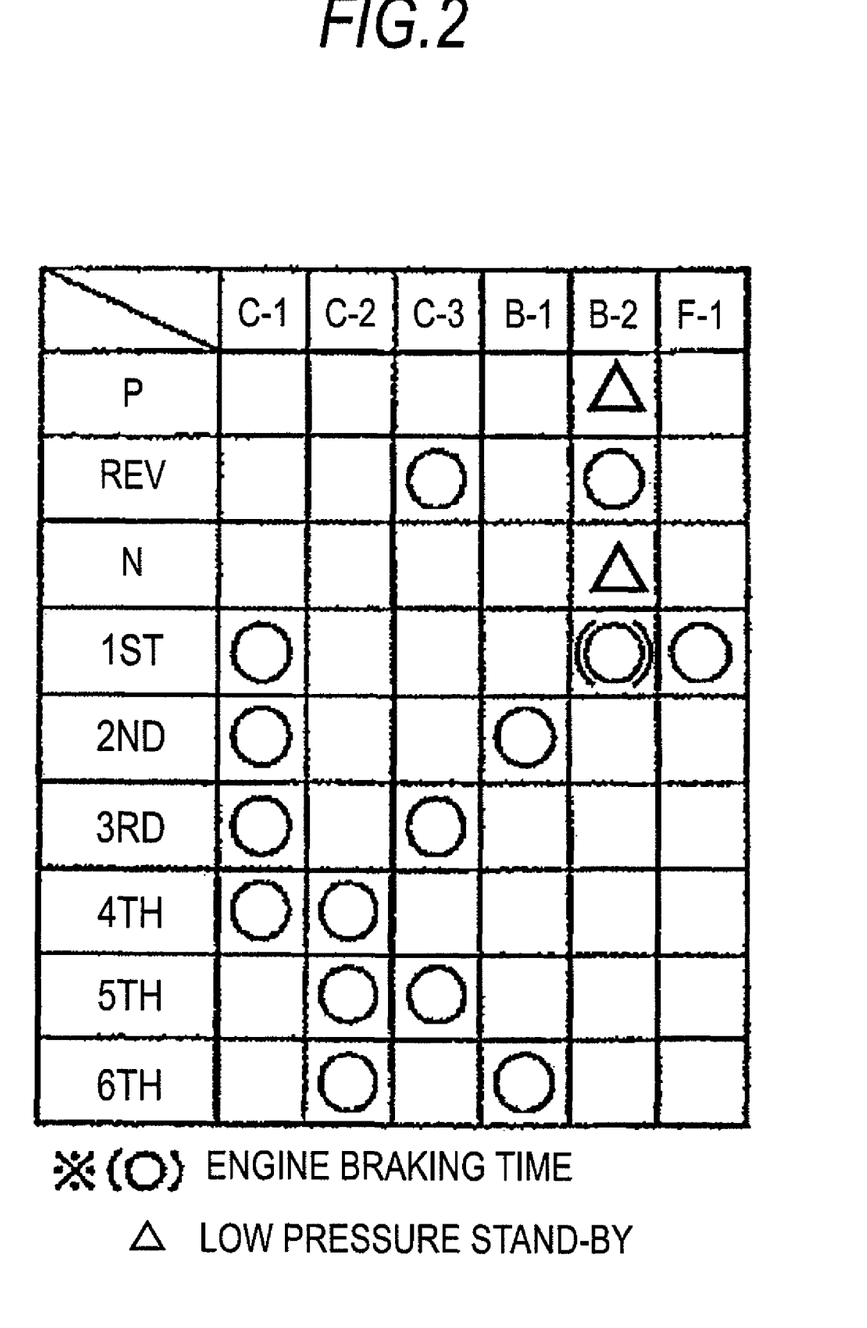
FIG. 2 is an engagement table of the automatic transmission.

The automatic transmission 1 of the heretofore described configuration, by the clutches C-1 to C-3, brakes B-1 and B-2, and one-way clutch F-1 shown in the skeleton diagram of FIG. 1 being engaged and disengaged, as shown in the engagement table of FIG. 2, achieves a first forward speed stage (1ST) to a sixth forward speed stage (6TH) and one reverse speed stage (REV).

Outline Configuration of Hydraulic Control Apparatus

Continuing, a description will be given of a hydraulic control apparatus $1_1$ of the automatic transmission according to the invention. Firstly, a rough description will be given of unshown portions of the hydraulic control apparatus $1_1$ which generate a line pressure, a secondary pressure, a modulator pressure, a range pressure, and the like. These line pressure, secondary pressure, modulator pressure, and range pressure generation portions, as they are the same as those of a hydraulic control apparatus of a common automatic transmission and well known, will be described in brief.

The hydraulic control apparatus $1_1$, including, for example, a manual valve MV, to be described hereafter, an unshown oil pump, primary regulator valve, secondary regulator valve, solenoid modulator valve, and linear solenoid (linear solenoid valve), causes an oil pressure to be generated, for example, in a form in which the oil pump rotation-drivably connected to the pump impeller 4a of the torque converter 4 sucks oil from an unshown oil pan via a strainer, when the engine is started, by being driven in conjunction with a rotation of the engine.

The oil pressure generated by the oil pump is adjusted to a line pressure $P_L$ while being subjected to a discharge adjustment by the primary regulator valve based on a signal pressure $P_{SLT}$ of the linear solenoid valve which is adjusted and output in accordance with a throttle opening. The line pressure $P_L$ is supplied to the manual valve (a range switching valve) MV, the solenoid modulator valve, a linear solenoid valve SLC3, to be described in detail hereafter, and the like. The line pressure $P_L$ supplied to the solenoid modulator valve, of these valves, is adjusted to a modulator pressure $P_{MOD}$ which is made an approximately constant pressure by the valve, and the modulator pressure $P_{MOD}$ is supplied as a source pressure of the linear solenoid valve, solenoid valves S1 and S2, to be described in detail hereafter, and the like.

The pressure discharged from the primary regulator valve is adjusted to a secondary pressure $P_{SEC}$ while being further subjected to the discharge adjustment by, for example, the secondary regulator valve, and the secondary pressure $P_{SEC}$, as well as being supplied to, for example, a lubricating oil passage and an oil cooler, is also supplied to the torque converter 4, and is also used in controlling the lock-up clutch 7.

Figure 3:
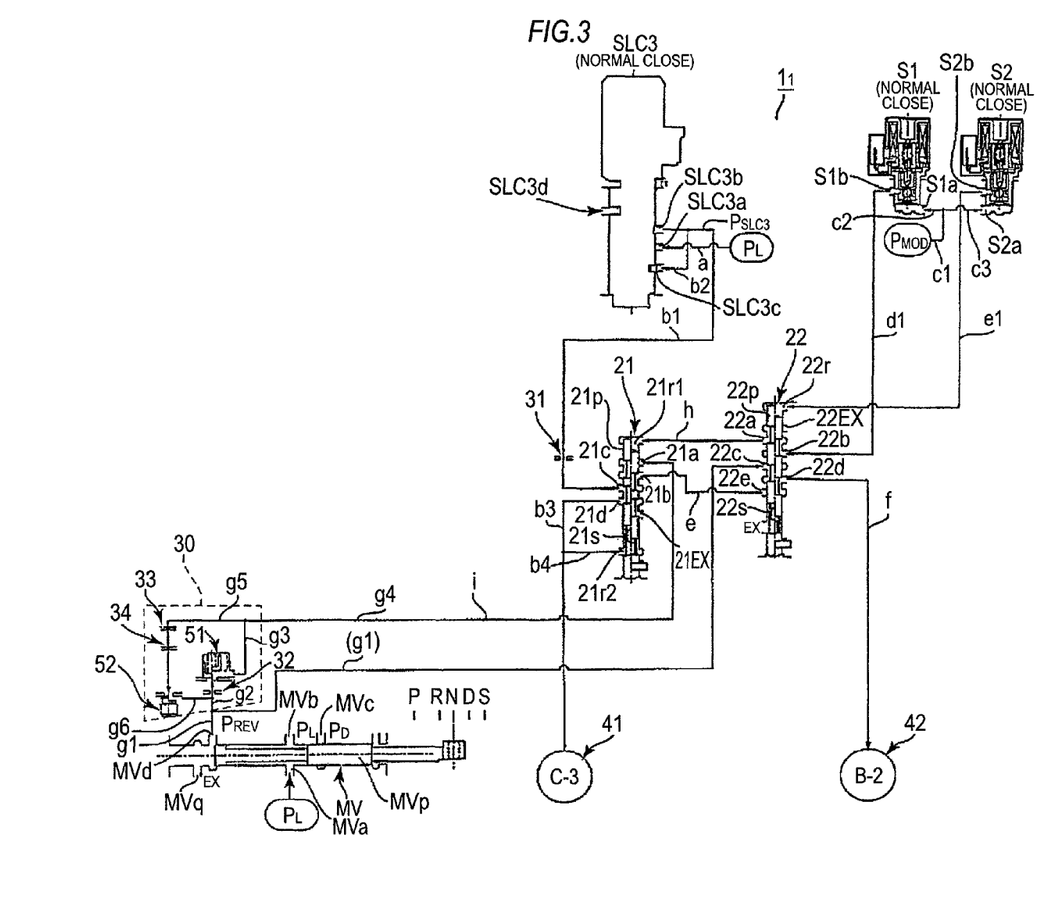
FIG. 3 is a circuit diagram showing a hydraulic control apparatus of an automatic transmission according to a first embodiment.

Meanwhile, as shown in FIG. 3, the manual valve MV, to be described in detail hereafter, having a spool MVp which is mechanically (or electrically) driven with a shift lever provided by a driver seat (not shown), sets an output condition or non-output condition (a drain) of the input line pressure $P_L$ by a position of the spool MVp being switched in accordance with a shift range (for example, P, R, N, or D) selected with the shift lever.

Detailed Configuration of Speed Change Control Portion in Hydraulic Control Apparatus Next, a description will be given, following FIG. 3, mainly of a portion which carries out a speed change control in the hydraulic control apparatus according to the invention. In the embodiment, in order to describe a spool position, the right half position shown in FIG. 3 will be referred to as a "right half position", and the left half position as a "left half position".

The hydraulic control apparatus $1_1$ is configured including a first hydraulic servo (a hydraulic servo) 41 of the first frictional engagement element (clutch) C-3, a second hydraulic servo (a hydraulic servo) 42 of the second frictional engagement element (brake) B-2, the linear solenoid (linear solenoid valve) SLC3 which adjusts the line pressure $P_L$ and outputs it as a hydraulic oil pressure (an engagement pressure) $P_{SLC3}$, a C3 relay valve 21 and the solenoid valve S1 which act as a first switching portion, a reverse range pressure oil passage (an oil passage) g1, a B2 relay valve 22 and the solenoid valve S2 which act as a second switching portion, a discharge delay oil passage i (oil passages e, g4, g5, and g6, and one portion of an oil passage g2 and the oil passage g1), and the B2 relay valve 22 and solenoid valve S2 which act as a third switching portion.

Herein, as will hereafter be described in detail, the first switching portion, having the C3 relay valve 21 and solenoid valve S1, supplies the hydraulic oil pressure (engagement pressure) $P_{SLC3}$, supplied from the linear solenoid valve SLC3, to the hydraulic servo 41 and hydraulic servo 42 by switching between the two. Also, the discharge delay oil passage i, being an oil passage connected to a drain port MVq of the manual valve MV via a delay portion 30, has the oil passages e, g4, g5, and g6, and the one portion of the oil passage g2 and oil passage g1. Also, in the circuit diagram of FIG. 3, the second switching portion and third switching portion, integrally configured, having a second clutch apply relay valve 22 and the solenoid valve S1, the reverse range pressure oil passage (oil passage) g1 being connected to the manual valve MV and supplying an R range pressure $P_{REV}$, supply the hydraulic oil pressure (engagement pressure) $P_{SLC3}$ or R range pressure $P_{REV}$, by switching between the two, to the hydraulic servo 42. Also, the second switching portion and third switching portion, at the same time as the reverse range pressure oil passage (oil passage) g1 and discharge delay oil passage i are connected, cause the reverse range pressure oil passage (oil passage) g1 and discharge delay oil passage i, by switching between the two, to communicate with the hydraulic servo 42.

The manual valve MV has the spool MVp which is switched in accordance with a parking range (a P range), a reverse range (an R range), a neutral range (an N range), a forward range (a D range), or the like, which are selected by the shift lever, and furthermore, has an input port MVa into which the line pressure $P_L$ is input, an output port MVc from which the line pressure $P_L$ is output as a D range pressure $P_D$, an output port MVd from which the line pressure $P_L$ is output as the R range pressure $P_{REV}$, and the drain port MVq.

With the manual valve MV, when the D range is selected based on an operation of the shift lever, the line pressure input port MVa into which the line pressure $P_L$ is input, and the forward range pressure output port (D range pressure output port) MVc, communicate based on a position of the spool MVp, and the line pressure $P_L$ is output from the D range pressure output port MVc as the forward range pressure (D range pressure) $P_D$. When the R range is selected based on an operation of the shift lever, the line pressure input port MVa and reverse range pressure output port (R range pressure output port) MVd communicate based on a position of the spool MVp, and the line pressure $P_L$ is output from the R range pressure output port MVd as the reverse range pressure (R range pressure $P_{REV}$). Also, when the P range and N range are selected based on an operation of the shift lever, as well as the line pressure input port MVa and the D range pressure output port MVc and R range pressure output port MVd being disconnected by the spool MVp, the D range pressure output port MVc is caused to communicate with an unshown drain port, and the R range pressure output port MVd is caused to communicate with the drain port MVq, that is, the non-output condition is attained in which the D range pressure $P_D$ and R range pressure $P_{REV}$ are drained (discharged).

The linear solenoid valve SLC3, being a normally closed type valve which attains the non-output condition when it is de-energized, has an input portion SLC3a into which the line pressure PL is input via an oil passage a, and an output port SLC3b from which a control pressure (a hydraulic pressure) $P_{SLC3}$, to which the line pressure $P_L$ is adjusted, is output to the hydraulic servos 41 and 42 as an engagement pressure $P_{C3}$ and an engagement pressure $P_{B2}$. That is, a linear solenoid valve SLC1 is configured in such a way as to be able, when it is de-energized, to disconnect the input portion SLC3a and output port SLC3b and attain the non-output condition, and when it is energized based on a command value from an unshown controller (an ECU), to increase an amount by which the input port SLC3a and output port SLC3b communicate (an opening amount) in accordance with the command value, that is, to output the engagement pressure $P_{C3}$ corresponding to the command value. Then, the output port SLC3b of the linear solenoid valve SLC3 is connected to an input port 21c of the C3 relay valve 21, to be described hereafter, via an oil passage b1 and an orifice 31. Also, the linear solenoid valve SLC3 has an input port SLC3c, and the input port SLC3c, as well as being connected to an oil passage b2 branching from the oil passage b1, is arranged in such a way that it, when de-energized, is caused to communicate with a drain port SLC3d, and when it is energized, the communication is disconnected.

The solenoid valve S1, being a normally closed type valve which attains the non-output condition when it is de-energized, has an input port S1a into which the modulator pressure $P_{MOD}$ is input via oil passages c1 and c2, and an output port S1b from which the modulator pressure $P_{MOD}$ is output approximately intact as a signal pressure $P_{S1}$ when the solenoid valve S1 is energized (that is, on). The output port S1b is connected to an input port 22b of the B2 relay valve 22, to be described hereafter, via an oil passage d1.

The solenoid valve S2, being a normally closed type valve which attains the non-output condition when it is de-energized, in the same way as the solenoid valve S1, has an input port S2a into which the modulator pressure $P_{MOD}$ is input via the oil passage c1 and an oil passage c3, and an output port S2b from which the modulator pressure $P_{MOD}$ is output approximately intact as a signal pressure $P_{S2}$ when the solenoid valve S2 is energized (that is, on). The output port S2b is connected to an oil chamber 22r of the B2 relay valve 22, to be described hereafter, via an oil passage e1.

The C3 relay valve 21 is configured having a spool 21p and a spring 21s which biases the spool 21p upward in the diagram (to the left half position side), also, having an oil chamber 21r1 on the upper end side of the spool 21p and an oil chamber 21r2 on the lower end side, and furthermore, having an input port 21a, an output port 21b, the input port 21c, an output port 21d, and a drain port 21EX in this order from the upper side in the diagram. The C3 relay valve 21 is configured in such a way that the input port 21a and output port 21b are disconnected, the input port 21c and output port 21b are caused to communicate, the input port 21c and output port 21d are disconnected, and the output port 21d and drain port 21EX are caused to communicate, by the spool 21p whose position is switched to the right half position (hereafter described like "in response to the right half position of the spool 21p").

Also, the C3 relay valve 21 is configured in such a way that, in a manner opposite to that in the heretofore described right half position, the input port 21a and output port 21b are caused to communicate, the input port 21c and output port 21b are disconnected, the input port 21c and output port 21d are caused to communicate, and the output port 21d and drain port 21EX are disconnected, in response to the left half position of the spool 21p.

The B2 relay valve 22 is configured having a spool 22p and a spring 22s which biases the spool 22p upward in the diagram (to the left half position side), also, having an oil chamber 22r on the upper end side of the spool 22p, and furthermore, having a drain port 22EX, an output port 22a, an input port 22b, an input port 22c, an output port 22d, and an input port 22e in this order from the upper side in the diagram. The B2 relay valve 22 is configured in such a way that the drain port 22EX and output port 22a are disconnected, the output port 22b and output port 22a are caused to communicate, the input port 22c and output port 22d are disconnected, and the input port 22e and output port 22d are caused to communicate, in response to the right half position of the spool 22p.

Also, the B2 relay valve 22 is configured in such a way that, in a manner opposite to that in the heretofore described right half position, the drain port 22EX and output port 22a are caused to communicate, the input port 22b and output port 22a are disconnected, the input port 22c and output port 22d are caused to communicate, and the input port 22e and output port 22d are disconnected, in response to the left half position of the spool 22p.

The output port SLC3b of the linear solenoid valve SLC3 is connected to the input port 21c of the C3 relay valve 21 via the oil passage b1 and orifice 31. Herein, output ports with which the input port 21c is caused to communicate differ between the left half position and right half position of the spool 21p. That is, the input port 21c is in communication with the output port 21d in response to the former left half position of the spool 21p, and furthermore, is connected to the hydraulic servo 41 via an oil passage b3. An oil passage b4 branches from the oil passage b3, and the oil passage b4 is connected to the oil chamber 21r2 of the C3 relay valve 21. Meanwhile, the input port 21c is in communication with the output port 21b in response to the right half position of the spool 21p, and furthermore, is connected to the input port 22e of the B2 relay valve 22 via the oil passage e. The input port 22e is in communication with the output port 22d in response to the right half position of the spool 22p, and furthermore, is connected to the hydraulic servo 42 via an oil passage f.

As above, the linear solenoid valve SLC3 is configured in such a way as to be caused to communicate with the hydraulic servo 41 via the C3 relay valve 21 when the spool 21p of the C3 relay valve 21 is switched to the left half position, and caused to communicate with the hydraulic servo 42 when the spool 21p is switched to the right half position and the spool 22p of the B2 relay valve 22 is switched to the right half position. To describe in other words with the C3 relay valve 21 as a reference, the C3 relay valve 21 is configured in such a way that the engagement pressure $P_{SLC3}$ output from the linear solenoid valve SLC3 can be supplied to the hydraulic servo 41 when the spool 21p is switched to the left half position, and supplied to the hydraulic servo 42 via the B2 relay valve 22 when the spool 21p is switched to the right half position. That is, the C3 relay valve 21 is configured in such a way as to be able to selectively switch a supply destination of an engagement pressure output from the linear solenoid valve SLC3 between the hydraulic servo 41 and hydraulic servo 42.

The R range pressure output port MVd of the manual valve MV is connected to the input port 22c of the B2 relay valve 22 via the oil passage g1, and the input port 22c is caused to communicate with the output port 22d in response to the left half position of the spool 22p, and furthermore, connected to the hydraulic servo 42 via the oil passage f. Also, the R range pressure output port MVd is connected to the input port 21a of the C3 relay valve 21 via the oil passage g2 branching from the oil passage g1, an orifice 32, a check valve 51, an oil passage g3, and the oil passage g4, and the input port 21a is caused to communicate with the output port 21b in response to the left half position of the spool 21p, and furthermore, is connected to the input port 22e of the B2 relay valve 22 via the oil passage e, and connected to the hydraulic servo 42 via the output port 22d, communicating with the input port 22e in response to the right half position of the spool 22p, and the oil passage f. The oil passage e is an oil passage used when the engagement pressure $P_{SLC3}$ output from the linear solenoid valve SLC3 is supplied to the B2 relay valve 22 from the C3 relay valve 21, as heretofore described. That is, the oil passage e is used both as an oil passage through which the engagement pressure $P_{SLC3}$ can be supplied to the B2 relay valve 22 from the C3 relay valve 21 in response to the right half position of the spool 21p of the C3 relay valve 21, and as an oil passage through which the R range pressure $P_{REV}$ from the manual valve MV can be supplied to the B2 relay valve 22 from the C3 relay valve 21 in response to the left half position of the spool 21p of the C3 relay valve 21. The oil passage g5 branching from the oil passage g3 is connected to the R range pressure output port MVd of the manual valve MV via an orifice 33, an orifice 34, a check valve 52, the oil passage g6, and one portion of the oil passages g2 and g1. In the circuit diagram of FIG. 3, the discharge delay oil passage i connected to the R range pressure output port MVd of the manual valve MV is configured of the oil passages e, g4, g5, and g6, and the one portion of the oil passages g2 and g1. In the N range and D range of the manual valve MV, the discharge delay oil passage i is in communication with the drain port MVq via the R range pressure output port MVd. Meanwhile, in the R range, this communication is disconnected, and the R range pressure output port MVd and input port MVa are caused to communicate. Also, the delay portion 30 is configured of the orifices 33 and 34, and the check valves 51 and 52, partway through the discharge delay oil passage i, and the delay portion 30 is arranged in such a way as to delay a discharge of an oil pressure discharged from the drain port MVq, via the R range pressure output port MVd, through the discharge delay oil passage i.

As above, with the manual valve MV, the R range pressure output port MVd thereof is caused to communicate with the hydraulic servo 42 via the B2 relay valve 22 when the spool 22p of the B2 relay valve 22 is switched to the left half position, and caused to communicate with the hydraulic servo 42 via the C3 relay valve 21 and B2 relay valve 22 when the spool 22p is switched to the right half position and the spool 21p of the C3 relay valve 21 is switched to the left half position. To describe in other words with the B2 relay valve 22 as a reference, the B2 relay valve 22 is configured in such a way that, by selectively switching between the input port 22c and input port 22e, a pressure (the R range pressure $P_{REV}$) input into either of the two can be output from the output port 22d and supplied to the hydraulic servo 42.

The C3 relay valve 21 and B2 relay valve 22 are switched by the solenoid valve S1 and solenoid valve S2. The oil passage e1 is connected to the output port S2b of the solenoid valve S2, and the oil passage e1 is connected to the oil chamber 22r of the B2 relay valve 22. Also, the oil passage d1 is connected to the output port S1b of the solenoid valve S1, and the oil passage d1 is connected to the input port 22b of the B2 relay valve 22. The input port 22b is caused to communicate with the output port 22a in response to the right half position of the spool 22p, and furthermore, connected to the oil chamber 21r1 of the C3 relay valve 21 via an oil passage h. The solenoid valve S2, when it is on, outputs the modulator pressure $P_{MOD}$, input into the input port S2a via the oil passages c1 and c3, approximately intact from the output port S2b, and inputs it into the oil chamber 22r of the B2 relay valve 22, as a signal pressure $P_{S2}$, via the oil passage e1. With the B2 relay valve 22, by the signal pressure $P_{S2}$ being thus input, the spool 22p is switched to the right half position against the biasing force of the spring 22s. Meanwhile, with the B2 relay valve 22, as the signal pressure $P_{S2}$ is not input into the oil chamber 22r when the solenoid valve S2 is off, the spool 22p is switched to the left half position by the biasing force of the spring 22s.

The solenoid valve S1, when it is on, outputs the modulator pressure $P_{MOD}$, input into the input port S1a via the oil passages c1 and c2, approximately intact from the output port S1b, and inputs it into the input port 22b of the B2 relay valve 22, as the signal pressure $P_{S1}$, via the oil passage d1. The signal pressure $P_{S1}$ is input into the oil chamber 21r1 of the C3 relay valve 21 via the output port 22a, caused to communicate with the input port 22b in response to the left half position of the spool 22p of the B2 relay valve 22, and the oil passage h. With the C3 relay valve 21, by the signal pressure $P_{S1}$ being thus input, the spool 21p is switched to the right half position against the biasing force of the spring 21s. Meanwhile, with the C3 relay valve 21, as the signal pressure $P_{S1}$ is not input into the oil chamber 21r1 when the solenoid valve S1 is off or in response to the left half position of the spool 22p of the B2 relay valve 22, the spool 21p is switched to the left half position by the biasing force of the spring 21s.

Operation of Hydraulic Control Apparatus

Next, a description will be given of an operation of the hydraulic control apparatus $1_1$ according to the embodiment.

For example, on an ignition being turned on by a driver, a hydraulic control of the hydraulic control apparatus $1_1$ is started. Firstly, when a selection position of the shift lever is in, for example, the P range or N range, for example, on the engine being started, an oil pressure occurs by the oil pump (not shown) rotating based on an engine rotation, and the oil pressure is output adjusted to the line pressure $P_L$ or modulator pressure $P_{MOD}$ by the primary regulator valve or solenoid modulator valve respectively, as heretofore described, and as well as the line pressure $P_L$ being input into the input port MVa of the manual valve MV and into the input port SLC3a of the linear solenoid valve SLC3 via the oil passage a, the modulator pressure $P_{MOD}$ is input into input ports S1a and S2a of the solenoid valves S1 and S2 via the oil passages c1, c2, and c3.

Continuing, for example, on the driver changing the shift lever from an N range position to a D range position, the D range pressure $P_D$ is output from the D range pressure output port MVc of the manual valve MV via an unshown passage to another unshown linear solenoid valve. Herein, for example, on the driver accelerating the vehicle, the vehicle is upshifted from the first forward speed stage (1ST) step by step to the sixth forward speed stage (6TH).

Subsequently, for example, the driver decelerates the vehicle, and after the vehicle, by being downshifted in accordance with a vehicle speed, has stopped in the first forward speed stage condition, on the driver changing the shift lever from the D range position to the N range position, the D range pressure output port MVc and input port MVa of the manual valve MV, as well as being disconnected, are caused to communicate with the unshown drain port, that is, the forward range pressure $P_D$ is drained.

Also, at the same time, it is detected by a shift lever sensor (not shown) that the shift lever is in the N range position, and on the N range being determined based on the shift lever position by the controller, firstly, the linear solenoid valve SLC3 is turned off (de-energized), and the control pressure (engagement pressure) $P_{SLC3}$ is drained to become a zero pressure (the non-output condition), that is, the oil pressure of each hydraulic servo 41 and 42 is drained, thus releasing the clutch C-3 and brake B-2.

Operations at R-N-D and R-N-R Switching Times

A description will be given, following the flow chart of FIG. 4 and the time chart of FIG. 5, of an operation at an R-N-D switching time, while referring to the engagement table of FIG. 2 and the circuit diagram of FIG. 3 as appropriate.

In the R range (time 0 to time t1 in FIG. 5) before a switching at an R-N switching time (step S11, hereafter described simply as "S11"), the solenoid valve 51 becomes off, while the solenoid valve S2 becomes on, and as the signal pressure $P_{S2}$ from the solenoid valve S2 is input into the oil chamber 22r, the B2 relay valve 22 is switched to the right half position, as shown in FIG. 3. Meanwhile, as the signal pressure $P_{S1}$ from the solenoid valve S1 is not input into the oil chamber 21r1, the C3 relay valve 21 is switched to the left half position. In this condition, the engagement pressure $P_{SLC3}$ from the linear solenoid valve SLC3 is being supplied to the hydraulic servo 41 via the oil passage b1, C3 relay valve 21, and oil passage b3. Also, the R range pressure $P_{REV}$ from the R range pressure output port MVd is being supplied to the hydraulic servo 42 from the manual valve MV via the oil passage g1, C3 relay valve 21, oil passage e, B2 relay valve 22, and oil passage f. That is, as shown in FIG. 2, in the R range (REV), both the clutch C-3 and brake B-2 are in engagement.

Along with a switching (time t1) of the manual valve MV to a position corresponding to the R range, the oil pressure is gradually drained from the clutch C-3 while a discharge amount from the drain port SLC3d is being adjusted by a control (S12) of the linear solenoid valve SLC3. The engagement pressure $P_{C3}$ of the clutch C-3 at this time is gradually reduced, relatively suddenly at first and gently thereafter, as shown by the chain double-dashed line in FIG. 5. Meanwhile, the engagement pressure $P_{B2}$ of the brake B-2 is gradually reduced in a gentle curve, as shown in the thin solid line in FIG. 5 (S13). That is, the engagement pressure $P_{B2}$ of the brake B-2 is discharged from the drain port MVq via the oil passage f, the output port 22d and input port 22e of the B2 relay valve 22, the oil passage e, the output port 21b and input port 21a of the C3 relay valve 21, the oil passages g4 and g5, the delay portion 30 (orifices 33 and 34, and check valves 51 and 52), the oil passage g6, the one portion of the oil passages g2 and g1, and the R range pressure output port MVd of the manual valve MV. The oil passages e, g4, g5, and g6, and the one portion of the oil passages g2 and g1 configure the discharge delay oil passage i, as heretofore described. That is, the engagement pressure $P_{B2}$ of the brake B-2, being discharged from the drain port MVq of the manual valve MV via the oil passage f and discharge delay oil passage i as oil passages, is discharged in a condition in which the discharge rate is reduced by the orifices 33 and 34, and the like, of the delay portion 30 provided in the discharge delay oil passage i. For comparison, a reduction in oil pressure when the engagement pressure $P_{B2}$ of the brake B-2 is discharged via the oil passage g1 without the discharge delay oil passage i being provided is shown by the wavy line in the diagram. In this way, it is possible to make a reduction in the engagement pressure $P_{B2}$ gentle, that is, to make it difficult for the oil pressure to drain, as shown by arrow A1, in comparison with the case of providing the discharge delay oil passage i and discharging the engagement pressure $P_{B2}$ of the brake B-2 via the discharge delay oil passage i.

After a predetermined time has passed (YES of S14, time t2), the solenoid valve S1 is turned on (S15), the signal pressure $P_{S1}$ is input into the oil chamber 21$r$1 of the C3 relay valve 21, and the C3 relay valve 21 is switched to the right half position. Because of this, the engagement pressure $P_{C3}$ of the clutch C-3 is discharged from the drain port 21EX of the C3 relay valve 21, and decreases suddenly. Meanwhile, the brake B-2 is maintained at a low pressure via the C3 relay valve 21 and B2 relay valve 22 by using an SLC3 pressure controlled by the linear solenoid valve SLC3 (S16).

Subsequently, when the range is switched to the D range (YES of S17), a first filling is carried out to the clutch C-1 corresponding to the first forward speed stage by the unshown linear solenoid valve SLC1 (S18), and furthermore, an SLC1 pressure is gradually increased (S19). On the SLC1 pressure becoming highest (S20), the clutch C-1 is engaged. Subsequently, on a 1-2 change point being exceeded (YES of S21), the solenoid valves S1 and S2 are turned off at time t4 (S22 and S23). Because of this, the engagement pressure $P_{B2}$ of the brake B-2 is swiftly discharged from the drain port of the B2 relay valve 22 (S24), and the engagement pressure $P_{B2}$ of the brake B-2 reaches zero (S25). Subsequently, a first filling of the brake B-1 is carried out (S26), then, the engagement pressure $P_{B1}$ of the brake B1 is gradually increased (S27), and on the engagement pressure $P_{B1}$ becoming highest, the brake B-1 is engaged (S28).

Figure 6:
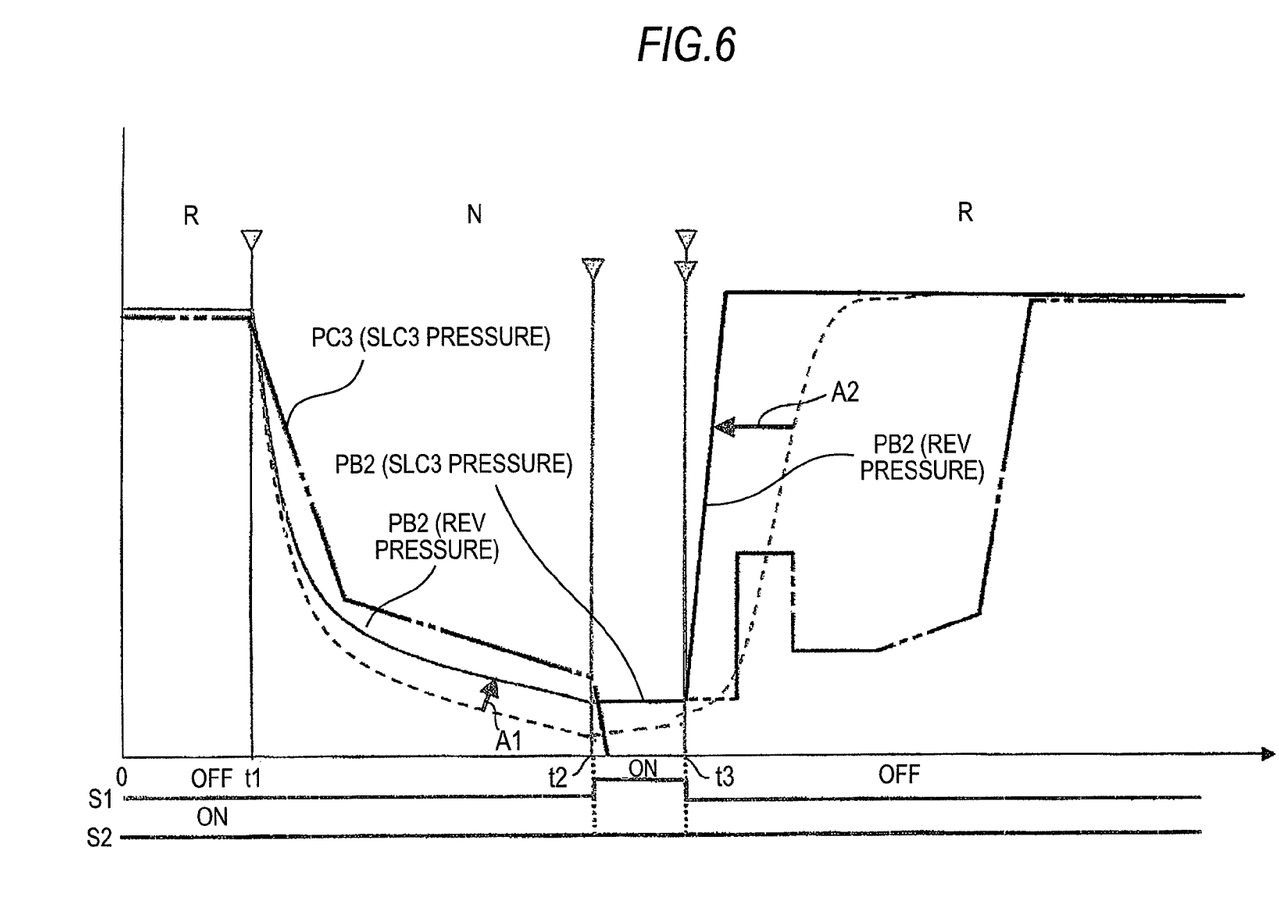
FIG. 6 is a time chart illustrating an operation at an R-N-R switching time of the hydraulic control apparatus of the automatic transmission according to the first embodiment.

Next, a description will be given, referring mainly to FIGS. 3 and 6, of an operation at an R-N-R switching time. As an R-N switching in the R-N-R switching is the same as in the R-N-D switching, that is, the same as in S11 to S17 of the flow chart of FIG. 4, a description will be omitted.

Figure 4:
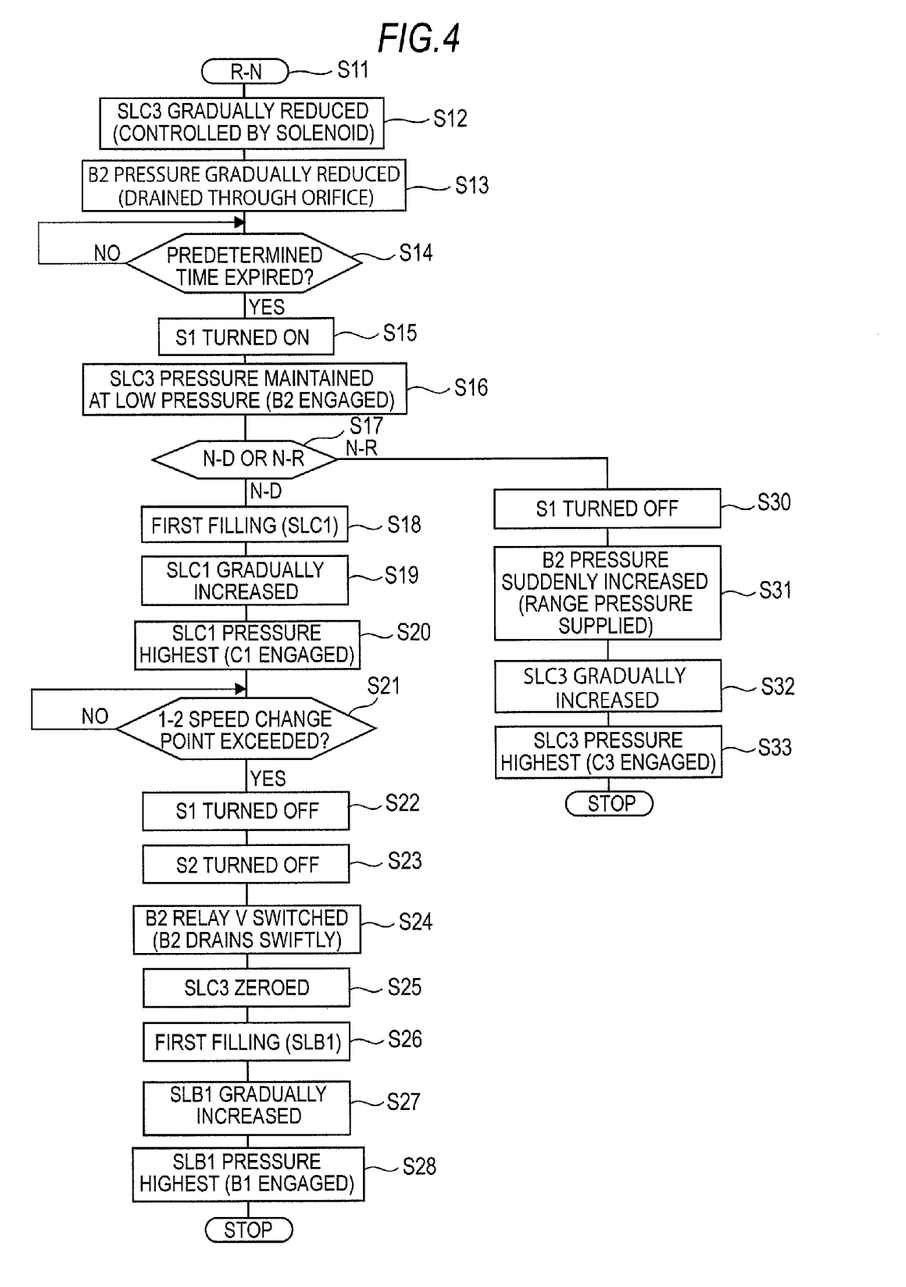
FIG. 4 is a flow chart illustrating an operation of the hydraulic control apparatus of the automatic transmission according to the first embodiment.
Figure 5:
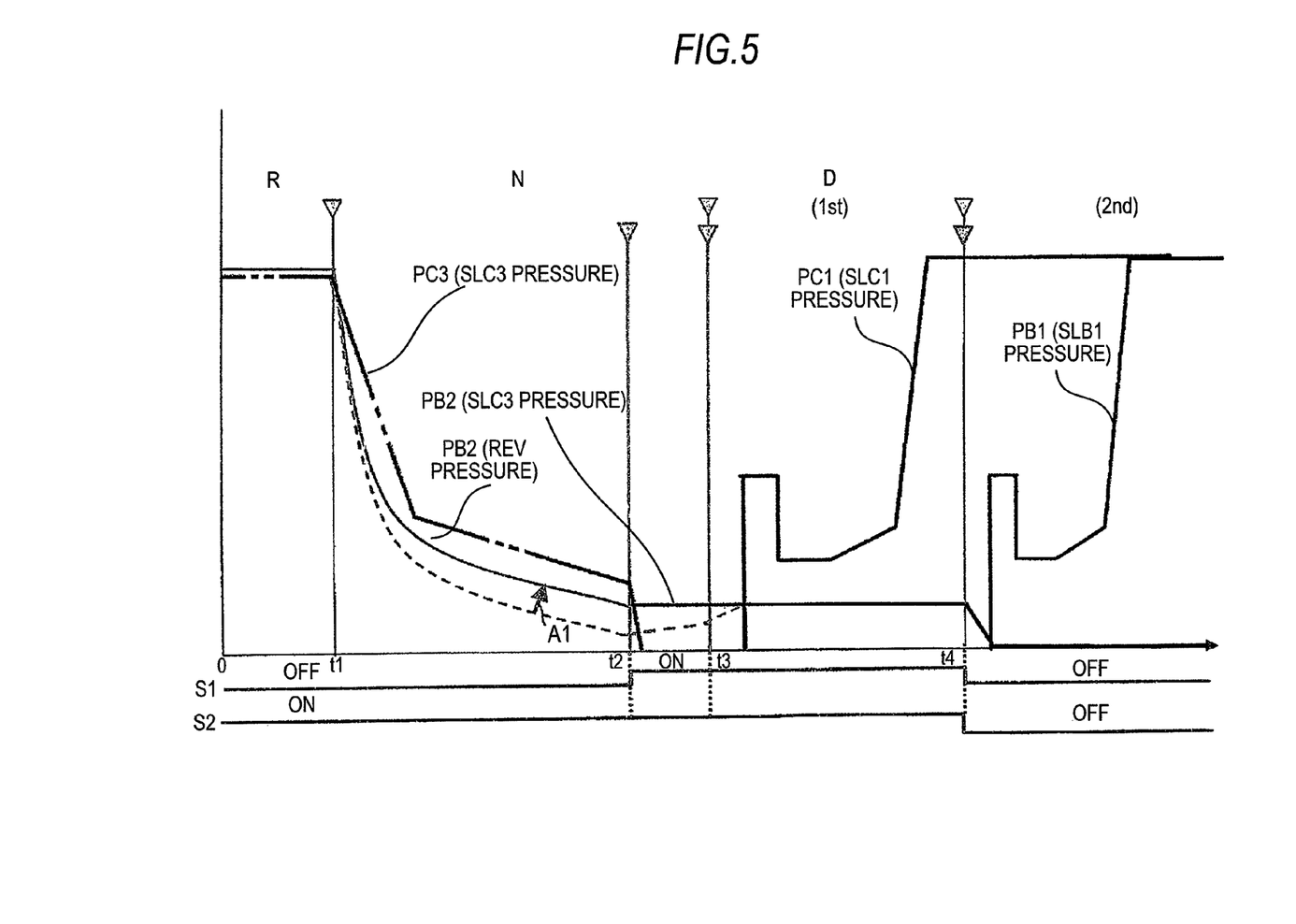
FIG. 5 is a time chart illustrating an operation at an R-N-D switching time of the hydraulic control apparatus of the automatic transmission according to the first embodiment.

In step S17 of the flow chart of FIG. 4, in a case of an N-R switching, the solenoid valve S1 is turned off at time t3 (S30), and the spool 22$p$ of the B2 relay valve 22 attains the left half position, while the spool 21$p$ of the C3 relay valve 21 attains the left half position. Because of this, as the R range pressure $P_{REV}$ is supplied to the brake B-2 from the R range pressure output port MVd of the manual valve MV via the oil passage g1, B2 relay valve 22, and oil passage f, the engagement pressure $P_{B2}$ of the brake B-2 is suddenly increased. At this time, as the engagement pressure $P_{B2}$ of the brake B-2 is maintained at a low pressure between time t2 and time t3, as heretofore described, it is possible to suddenly increase the engagement pressure $P_{B2}$ of the brake B-2 (S31) (refer to arrow A2). Meanwhile, the SLC3 pressure is gradually increased by being controlled by the linear solenoid valve SLC3 (S32), and subsequently, on the SLC3 pressure becoming highest, the clutch C-3 is engaged.

As above, the discharge delay oil passage i from which the engagement pressure $P_{B2}$ of the brake B-2 is discharged is provided separately, and by the oil pressure being discharged via the discharge delay oil passage i at the R-N switching time, it is possible to maintain the pressure of the brake B-2 so that it is made difficult for the pressure of the brake B-2 to drain, meaning that it is possible to suddenly increase the engagement pressure $P_{B2}$ of the brake B-2, in particular, at an N-R switching time which is the latter half of the R-N-R switching time. Also, in this kind of case in which the discharge delay oil passage i from which it is difficult for oil to drain is provided, for example, when the position of the manual valve MV is switched to a position corresponding to the D range, there is a danger that oil leaking into a discharge oil passage of the brake B-2 is supplied to the hydraulic servo 42 of the brake B-2, but, as the oil passage g1, from which it is easier for the oil pressure to drain than from the discharge delay oil passage i, is provided in response to this, this kind of danger is eliminated by switching the oil passage to the oil passage g1 and discharging the oil pressure.

Second Embodiment

A description will be given, following FIG. 7, of a second embodiment according to the invention.

A hydraulic control apparatus 1$_2$ of an automatic transmission 3 of the embodiment is configured including a manual shift valve 61, a hydraulic servo 75 of a clutch C-3 and a hydraulic servo 76 of a brake B-2 as first frictional engagement elements, a linear solenoid valve 62, a first switching portion 63, a second switching portion 66, a third switching portion 70, a reverse range pressure oil passage (an oil passage) k6, a discharge delay oil passage (an oil passage) k7, and an orifice 77 as a delay portion.

The first switching portion 63 has a first switching valve 65 and a first solenoid valve 64 which switches it depending on whether or not there is a signal pressure output, the second switching portion 66 has a second switching valve 68 and a second solenoid valve 67 which switches it depending on whether or not there is a signal pressure output, and the third switching portion 70 has a third switching valve 72 and a third solenoid valve 71 which switches it depending on whether or not there is a signal pressure output.

The first switching valve 65 is connected to the linear solenoid valve 62 via an oil passage k1, also, connected to the hydraulic servo 75 via an oil passage k2, and furthermore, connected to the second switching valve 68 via an oil passage k3. The second switching valve 68 is connected to the first switching valve 65 via the oil passage k3, connected to the third switching valve 72 via an oil passage k4, and connected to the hydraulic servo 76 via an oil passage k5. The third switching valve 72 is connected to the second switching valve 68 via the oil passage k4, connected to the manual shift valve 61 via the R range pressure oil passage k6, and furthermore, connected to a drain port EX via the discharge delay oil passage k7 partway through which the orifice 77 is disposed.

With the hydraulic control apparatus 1$_2$ of the heretofore described configuration, an engagement pressure input via the oil passage k1 from the linear solenoid valve 62 can be output to the oil passage k2 and oil passage k3 by switching between the two by the first switching valve 65 being switched by the first solenoid valve 64. The engagement pressure output to the former oil passage k2 is supplied to the hydraulic servo 75, while the engagement pressure output to the latter oil passage k3 is input into the second switching valve 68. The manual shift valve 61 being connected to the R range pressure oil passage k6 so that an input port into which a line pressure $P_L$ is input and the drain port EX are switchable, when the manual shift valve 61 is switched to the input port, an R range pressure $P_{REV}$ is output to the R range pressure oil passage k6.

The third switching valve 72, by being switched by the third solenoid valve 71, outputs the R range pressure $P_{REV}$ input via the R range pressure oil passage k6 to the second switching valve 68. The second switching valve 68, by being switched by the second solenoid valve 67, supplies the engagement pressure supplied via the oil passage k3 and the R range pressure $P_{REV}$ supplied via the oil passage k4, by switching between the two, to the hydraulic servo 76 via the oil passage k5.

With the hydraulic control apparatus 1$_2$ of the heretofore described configuration, oil passages when discharging the oil pressure supplied to the hydraulic servo 76 are selectable by the third switching valve 72 being switched. That is, one is an oil passage through which the oil pressure is discharged from the drain port EX of the manual shift valve 61 via the oil passages k5 and k4, and R range pressure oil passage k6, and the other is an oil passage through which the oil pressure is discharged from the drain port EX via the oil passages k5 and k4, discharge delay oil passage k7, and orifice 77.

Because of this, for example, it is possible to cause the oil pressure discharged via the discharge delay oil passage k7 to be more delayed than the oil pressure discharged via the R range pressure oil passage k6, that is, to make it difficult for the former oil pressure to drain from the hydraulic servo 76. Consequently, by adopting an arrangement such that the oil pressure is discharged through an oil passage using the discharge delay oil passage k7 at the R-N switching time, as described in the first embodiment and, for example, in the D range, the oil pressure is discharged using the R range pressure oil passage k6, it is possible to achieve the same advantages as those of the first embodiment.

Figure 7:
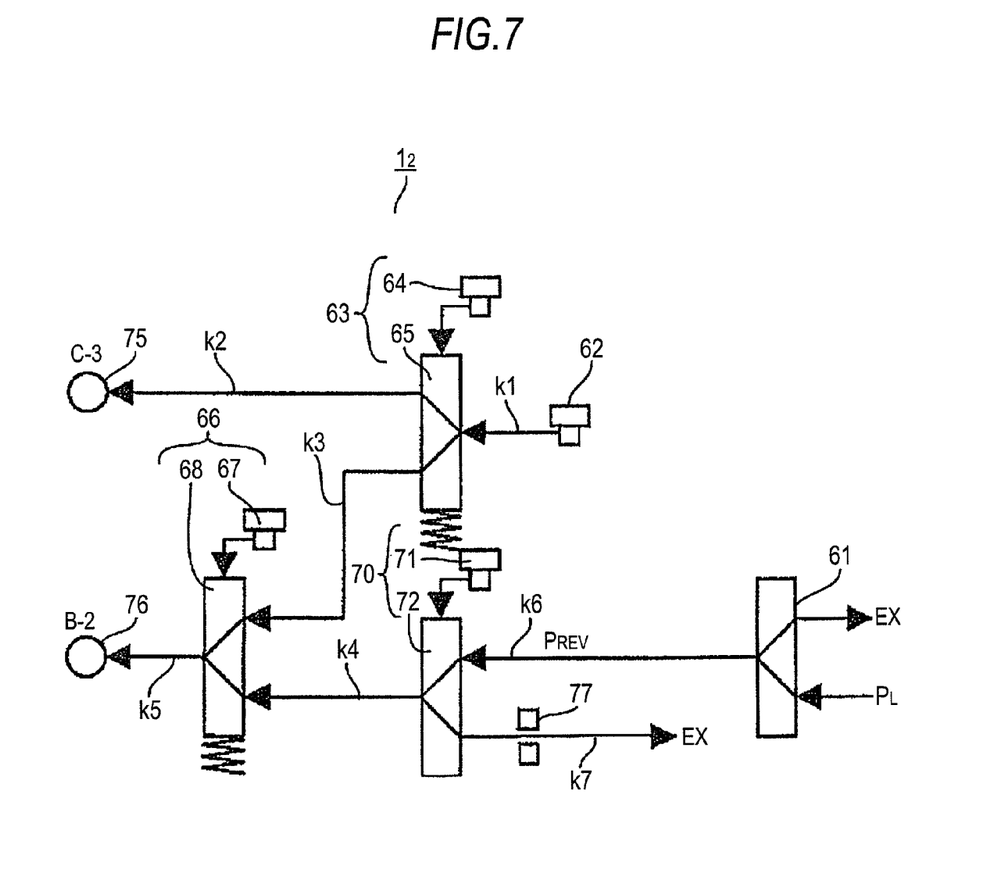
FIG. 7 is a circuit diagram showing a hydraulic control apparatus of an automatic transmission according to a second embodiment.

Herein, in place of the configuration shown in FIG. 7, it is possible to configure one switching valve by integrating the first switching valve 65 and second switching valve 68, along with which it is also possible to configure one solenoid valve by integrating the first solenoid valve 64 and second solenoid valve 67. In this case, it is possible to simplify the whole configuration.

In the heretofore described first and second embodiments, a case in which the hydraulic control apparatus $1_1$ and $1_2$ of the automatic transmissions are applied to the automatic transmission 3 which achieves six forward speed stages and one reverse speed stage is described as one example, but the invention, of course, not being limited to this, may be applied to, for example, an automatic transmission which achieves eight forward speed stages, and can be applied to any automatic transmission, in particular, provided that it is an automatic transmission which carries out a staged transmission.

The hydraulic control apparatus of the automatic transmission according to the invention can be used as a hydraulic control apparatus of an automatic transmission mounted in a car, a truck, or the like, and in particular, is suitable for use in a hydraulic control apparatus of an automatic transmission of which it is required that it is made difficult for an oil pressure, when discharged from a hydraulic servo of a frictional engagement element supplied with oil in the reverse range and neutral range, to drain at the R-N switching time, and made easy for it to drain in the D range or the like.

What is claimed is:

1. A hydraulic control apparatus of an automatic transmission including a first hydraulic servo of a first frictional engagement element supplied with oil in a reverse range and a forward range, and a second hydraulic servo of a second frictional engagement element supplied with oil in the reverse range and a neutral range, comprising:
a manual valve having an input port into which a line pressure is input and an output port from which the input line pressure is output as a reverse range pressure;
a linear solenoid which adjusts the line pressure and outputs it as a hydraulic oil pressure;
a first switching portion which outputs the hydraulic oil pressure, supplied from the linear solenoid, to the first hydraulic servo and second hydraulic servo by switching between the two;
a reverse range pressure oil passage connected to the output port;
a second switching portion which supplies the hydraulic oil pressure or reverse range pressure, by switching between the two, to the second hydraulic servo;
a discharge delay oil passage which discharges an oil pressure via a delay portion which delays an oil pressure output; and
a third switching portion which, at the same time as the reverse range pressure oil passage and discharge delay oil passage are connected, causes the reverse range pressure oil passage and discharge delay oil passage, by switching between the two, to communicate with the second hydraulic servo, wherein
the third switching portion causes the second hydraulic servo and discharge delay oil passage to communicate when the manual valve is switched to the neutral range, and causes the second hydraulic servo and reverse range pressure passage to communicate when the manual valve is switched to the forward range or reverse range.

2. The hydraulic control apparatus of the automatic transmission according to claim 1, wherein
the second switching portion and third switching portion are configured of one switching valve and a solenoid valve which switches the switching valve.

* * * * *